(12) United States Patent
Wang et al.

(10) Patent No.: US 8,263,981 B2
(45) Date of Patent: Sep. 11, 2012

(54) DISPLAY PANEL

(75) Inventors: Wen-Chun Wang, Taichung (TW); Yung-Cheng Chang, Taichung County (TW); Fa-Chen Wu, Yunlin County (TW)

(73) Assignee: Wintek Corporation, Taichung (TW)

( * ) Notice: Subject to any disclaimer, the term of this patent is extended or adjusted under 35 U.S.C. 154(b) by 0 days.

(21) Appl. No.: 13/093,866

(22) Filed: Apr. 26, 2011

(65) Prior Publication Data

US 2011/0266565 A1 Nov. 3, 2011

(30) Foreign Application Priority Data

Apr. 29, 2010 (TW) .............................. 99113698 A

(51) Int. Cl.
*H01L 27/14* (2006.01)

(52) U.S. Cl. ....... 257/59; 257/72; 257/91; 257/E33.066; 349/106; 349/149

(58) Field of Classification Search .................... 257/59, 257/72, 91, E33.066; 349/106, 149
See application file for complete search history.

(56) References Cited

U.S. PATENT DOCUMENTS

| 7,405,792 B2 * | 7/2008 | Lee ................................ 349/139 |
| 7,567,310 B2 * | 7/2009 | Chang et al. ..................... 349/43 |
| 7,796,204 B2 * | 9/2010 | Chang et al. ..................... 349/43 |

* cited by examiner

*Primary Examiner* — Tan N Tran
(74) *Attorney, Agent, or Firm* — Jianq Chyun IP Office

(57) ABSTRACT

A display panel having a display area and a non-display area outside the display area is provided. The display panel includes a first substrate, a conductive light-shielding pattern, color filter patterns, first spacers, transparent pads, a second substrate, scan lines, data lines, pixel structures, third pads and fourth pads. The conductive light-shielding pattern defines a conductive matrix pattern, a plurality of first pads and second pads. Each first pad is electrically connected with one of the corresponding second pads through the conductive matrix pattern. The color filter patterns include a plurality of first filter patterns and second filter patterns. The second filter patterns are located within the non-display area and disposed on the second pads. The first spacers are disposed on the second filter patterns, and the transparent pads cover the first spacers and contact the second pads.

12 Claims, 8 Drawing Sheets

DISPLAY PANEL

CROSS-REFERENCE TO RELATED APPLICATION

This application claims the priority benefit of Taiwan application serial no. 99113698, filed Apr. 29, 2010. The entirety of the above-mentioned patent application is hereby incorporated by reference herein and made a part of this specification.

BACKGROUND OF THE INVENTION

1. Field of the Invention

The invention relates to a display panel, and more particularly to a display panel having high aperture ratio and slim border by transmitting signals using light-shielding patterns on a color filter and spacers.

2. Description of Related Art

FIG. 1 illustrates a schematic top view of a conventional display panel. Referring to FIG. 1, a display panel 100 includes an array substrate 102 and a color filter substrate 104 stacked thereon. A plurality of scan lines 106 and a plurality of data lines (not shown) perpendicular to the scan lines 106 are disposed on the array substrate 102. The display panel 100 has a display area AA, where the scan lines 106 and the data lines are disposed interlacedly in the display area AA. Each scan line 106 is connected to a driving circuit 110 through a 108 to receive a scan signal transmitted from a driving circuit 110.

The display panel 100 can be designed based on a resolution of wide video graphic array (WVGA) standard, so that the resolution of the display panel 100 is 800×480, for example. Generally, the wires 108 are disposed on two opposite sides of the display area AA. In other words, 240 pieces of the wires 108 are disposed on each side of the display area AA. Assuming a line width of each wire 108 is 3 micrometer (μm) and a pitch between two adjacent wires 108 is 3 μm, then a total width of approximately 1.437 millimeter (mm) is required for disposing 240 pieces of the wires 108. Accordingly, a border width W of the display panel 100 is approximately 1.5 mm. In other words, the border width W on the two sides of the display area AA of the display panel 100 requires a preserved space of at least 3 mm to layout the wires 108 and other wirings.

In order to decrease the border width W of the display panel 100, the wires 108 are usually disposed in the display area AA in a conventional art, so that the wires 108 are parallel to the data lines. However, the layout of the wires adopted by conventional art leads to reduction in the aperture of the display panel 100. Moreover, a coupling effect occurs between the wires 108 and the data lines, so as to result in poor display quality. Consequently, it is imperative to reduce the border width W of the display panel and simultaneously maintain desirable display quality.

SUMMARY OF THE INVENTION

The invention relates to a display panel having high aperture ratio and slim border by using a light-shielding pattern and spacers to transmit signals.

The invention is directed to a display panel having a display area and a non-display area outside the display area. The display panel includes a first substrate, a conductive light-shielding pattern, a plurality of first spacers, a plurality of transparent pads, a second substrate, a plurality of scan lines, a plurality of data lines, a plurality of pixel structures, a plurality of third pads, and a plurality of fourth pads. The conductive light-shielding pattern disposed on the first substrate defines a conductive matrix pattern, a plurality of first pads, and a plurality of second pads. The conductive matrix pattern demarcates a plurality of pixel areas in the display area. The first pads and the second pads are located in the non-display area. Each first pad is electrically connected with one corresponding second pad through the conductive matrix pattern and electrically insulated with other second pads. The first spacers are disposed on the first pads and the second pads. The transparent pads are disposed on the first substrate to cover the first spacers and contact the second pads. The scan lines and the data lines are disposed on the second substrate, where the scan lines intersect with the data lines. The pixel structures are disposed on the second substrate and located in the corresponding pixel areas respectively. Each pixel structure is electrically connected with one of the scan lines and one of the data lines. The third pads and the fourth pads are disposed on the second substrate and located in the non-display area. The third pads are electrically connected to the first pads in a one-to-one manner. The fourth pads are electrically connected to the second pads in a one-to-one manner. Moreover, each fourth pad is directly connected to one of the scan lines or one of the data lines.

In light of the foregoing, the display panel of the invention is configured with the conductive light-shielding pattern in the color filter for the wiring layout, such that pads on different substrates are capable of electrically connecting with one another and transmitting signals through the disposition of spacers and transparent pads. Since the conductive light-shielding pattern is disposed in the display area, the display panel of the invention has slim border. In addition, the conductive light-shielding patterns are originally disposed for shielding unnecessary display light; thus, the aperture ratio of the pixel structure is not affected adversely. Namely, the display panel of the invention is capable of attaining slim border while maintaining high aperture ratio.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
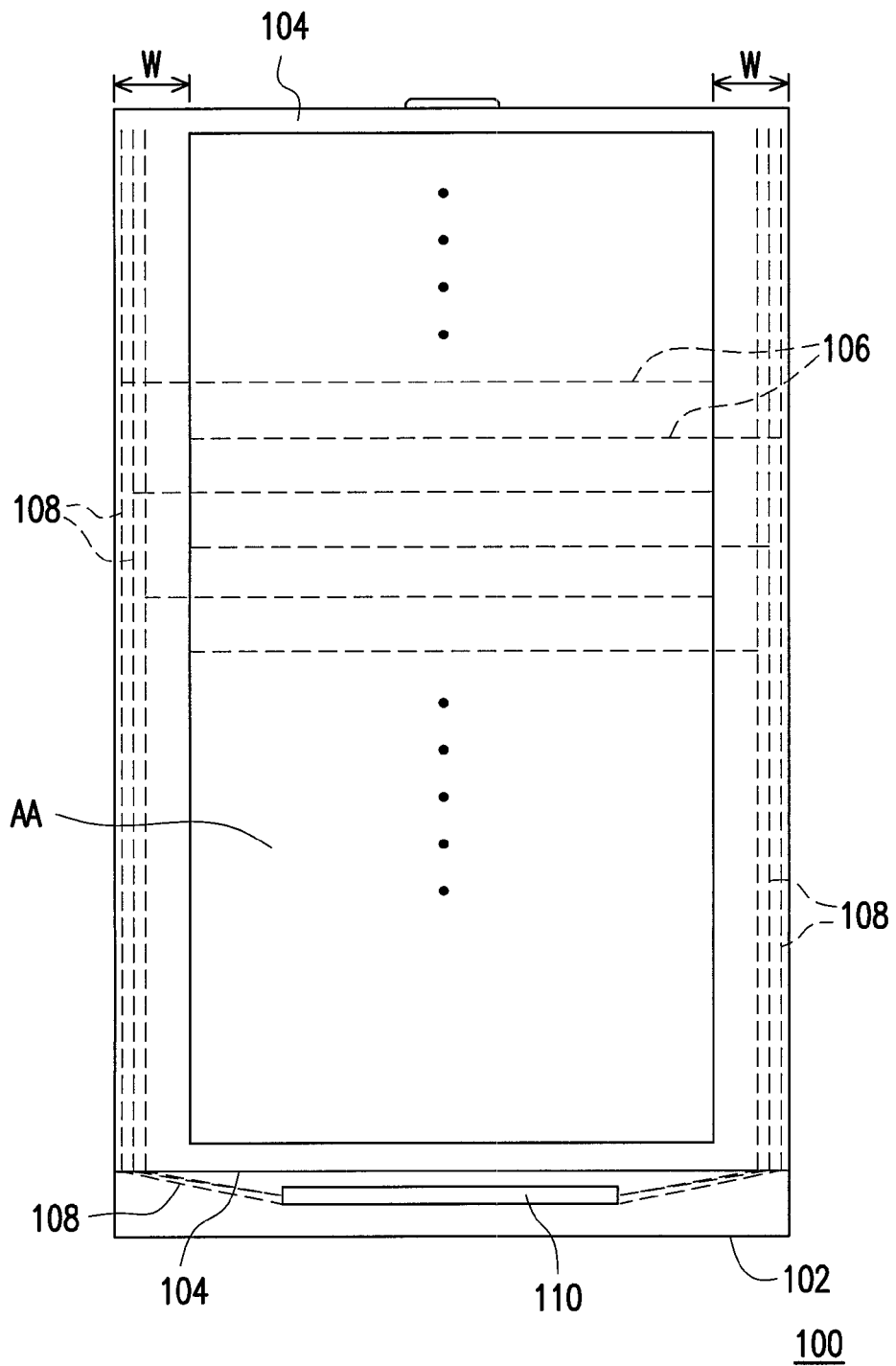
FIG. 1 illustrates a schematic top view of a conventional display panel.
Figure 2:
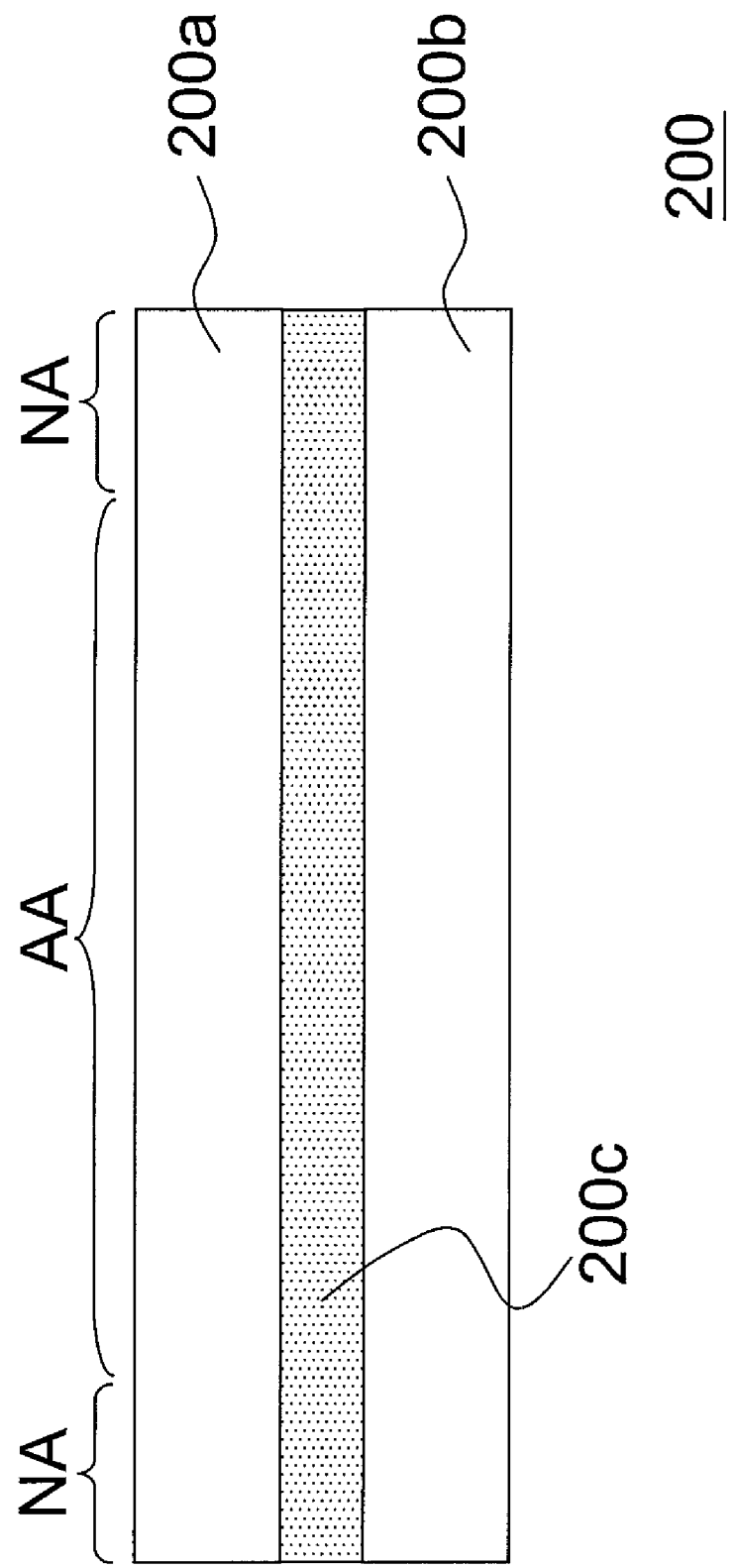
FIG. 2 is a schematic view of a display panel according to an embodiment of the invention.

FIG. 2 is a schematic view of a display panel according to an embodiment of the invention. Referring to FIG. 2, a display panel 200 includes a color filter substrate 200a, an array substrate 200b, and a display medium 200c. The color filter substrate 200a and the array substrate 200b are disposed oppositely to each other. The display medium 200c is located between the color filter substrate 200a and the array substrate 200b. In addition, the display panel 200 has a display area AA and a non-display area NA outside the display area AA.

In the present embodiment, the display medium 200c, for example, includes liquid crystals; that is, the display panel 200 is a liquid crystal display (LCD) panel. In other embodiments, the display medium 200c can be an electrophoresis material, an organic luminescent material, or other suitable display media. In other words, the display panel 200 of other embodiments includes an electrophoresis display (EPD) panel, an organic emitting diode (OLED) display panel, an electrowetting display (EWD) panel, or other panels.

Figure 3:
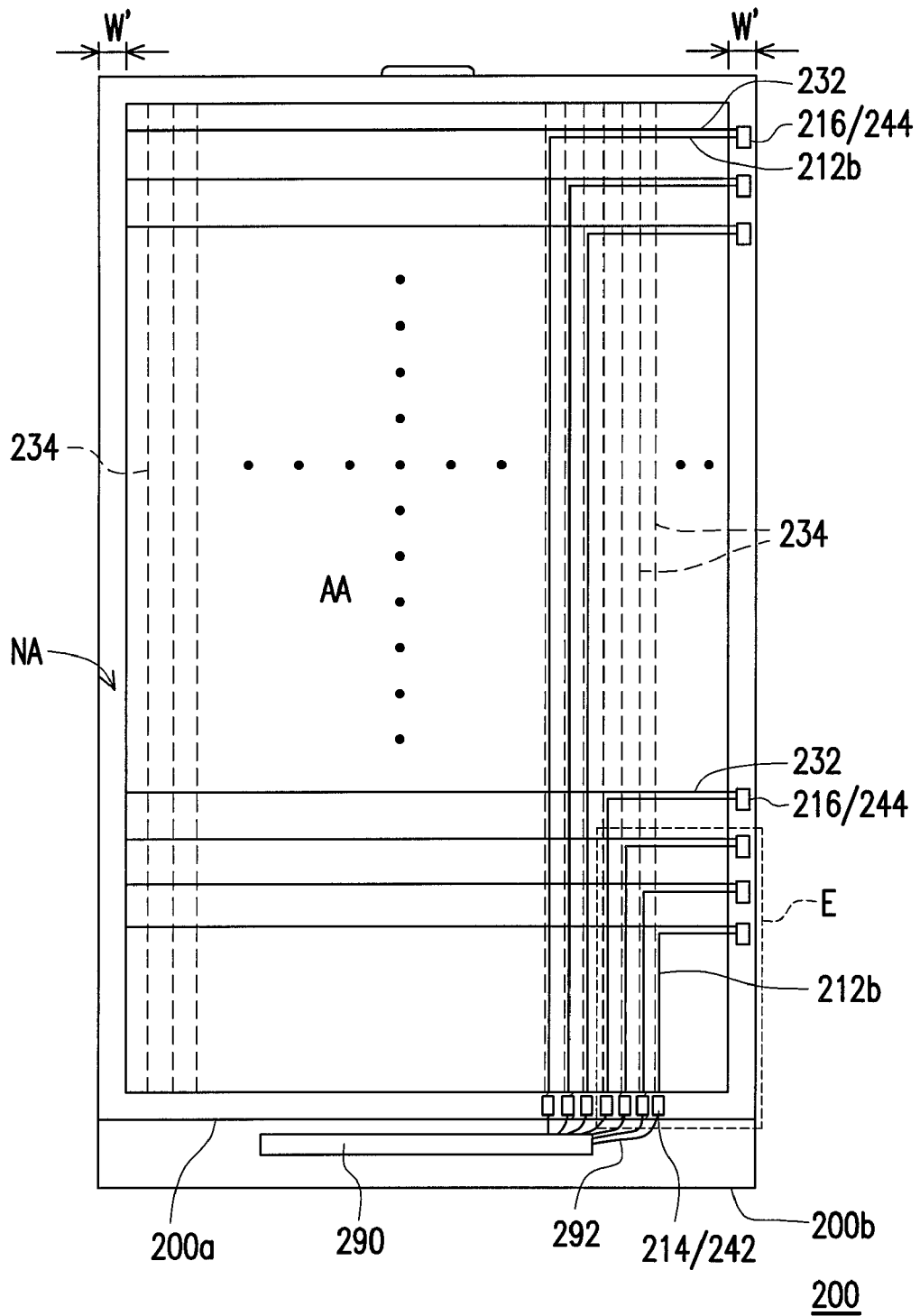
FIG. 3 illustrates a schematic top view of a display panel illustrated in FIG. 2.
Figure 4:
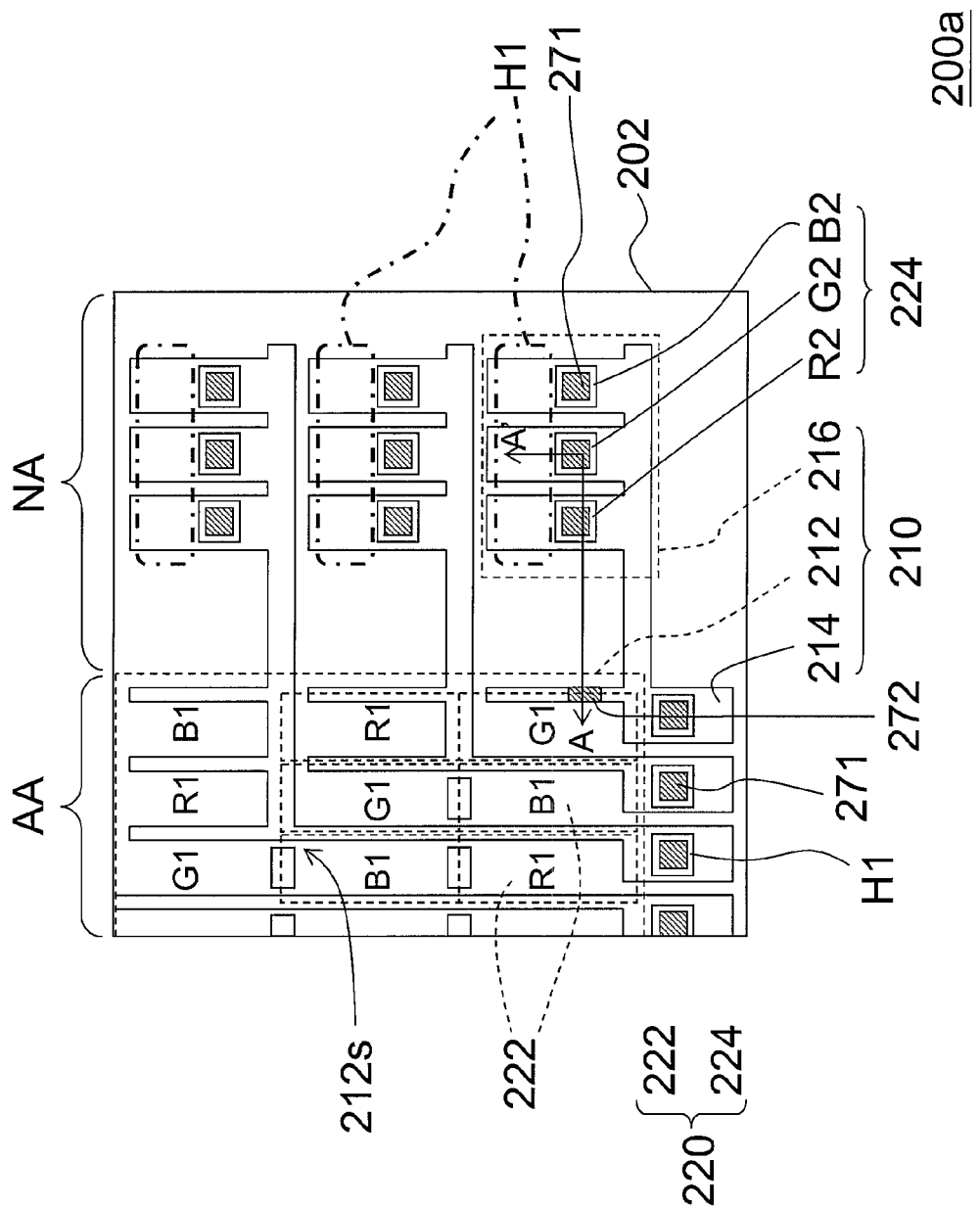
FIG. 4 is a schematic top view illustrating a portion of a color filter substrate shown in FIG. 2.
Figure 5:
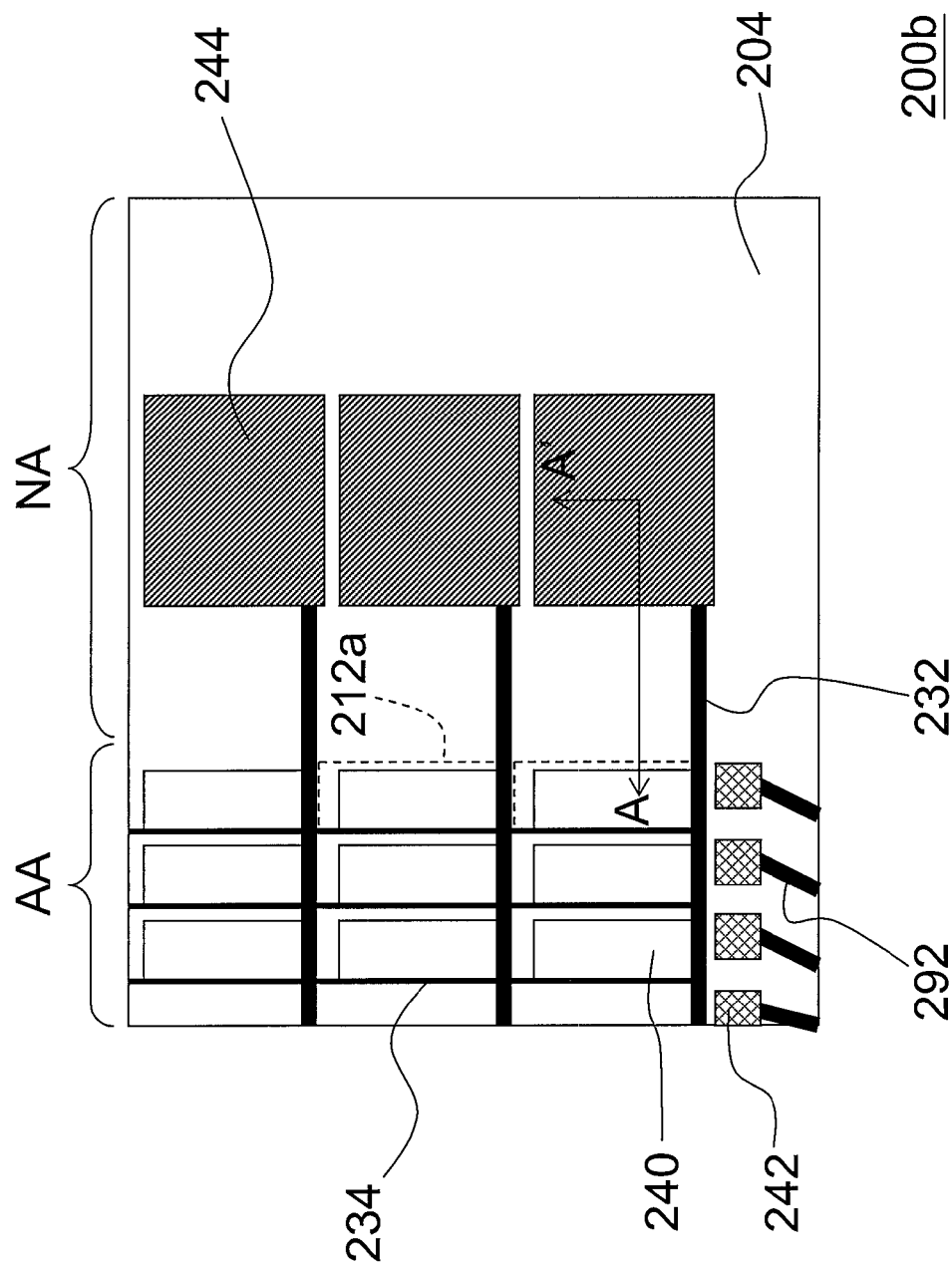
FIG. 5 is a schematic top view illustrating a portion of an array substrate shown in FIG. 2.
Figure 6:
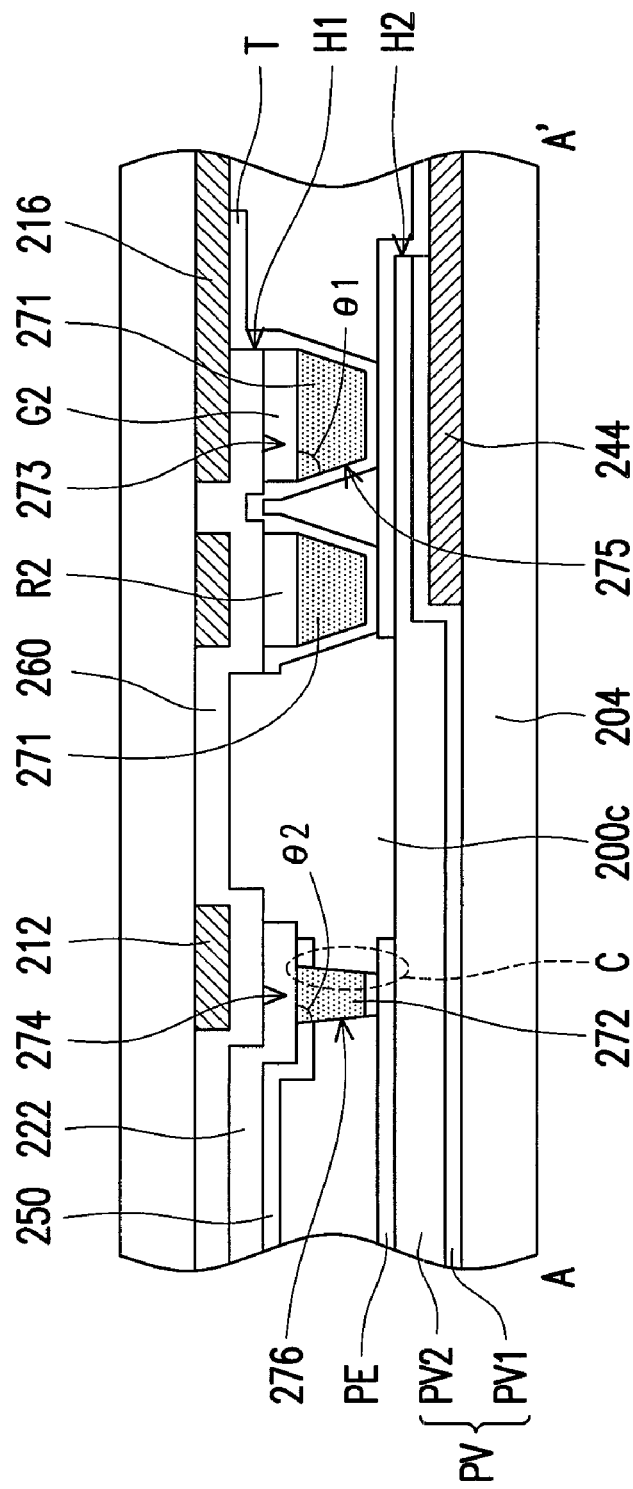
FIG. 6 is a schematic cross-sectional view of a portion of FIG. 2 taken along a line A-A' in FIG. 4 and FIG. 5.

FIG. 3 illustrates a schematic top view of the display panel illustrated in FIG. 2. FIG. 4 is a schematic top view illustrating a portion of the color filter substrate shown in FIG. 2. FIG. 4 corresponds to an area E of FIG. 3 and the components thereof are partially illustrated. FIG. 5 is a schematic top view illustrating a portion of the array substrate shown in FIG. 2. FIG. 6 is a schematic cross-sectional view of a portion of FIG. 2 taken along a line A-A' in FIG. 4 and FIG. 5.

Referring to FIG. 3, a plurality of signal transmission paths 212b is defined on the color filter substrate 200a. A plurality of scan lines 232 and a plurality of data lines 234 are disposed on the array substrate 200b. The scan lines 232 intersect with the data lines 234 so as to transmit signals required for displaying. In the present embodiment, each of the signal transmission paths 212b correspond to one of the scan lines 232 respectively. Hence, the signals outputted by a driving circuit 290 can be transmitted to the corresponding scan lines 232 through wires 292 and the signal transmission paths 212b so as to reduce a border width W'.

In details, referring to FIG. 3, FIG. 4, and FIG. 6 simultaneously, the color filter substrate 200a includes a first substrate 202 and the elements disposed thereon such as a conductive light-shielding pattern 210, a plurality of color filter patterns 220, a plurality of first spacers 271, and a plurality of transparent pads T. A conductive matrix pattern 212, a plurality of first pads 214, and a plurality of second pads 216 are defined by the conductive light-shielding pattern 210. The conductive matrix pattern 212 demarcates the display area AA into a plurality of pixel areas R1, G1, B1, and the first pads 214 and the second pads 216 are located in the non-display area NA.

Specifically, the conductive light-shielding pattern 210 of the present embodiment is made of metal, metal oxide, metal nitride, or other conductors capable of shielding light. In other words, the conductive light-shielding pattern 210 has conductivity and can be configured for transmitting signals. In the present embodiment, the conductive matrix pattern 212 has a plurality of gaps 212s. Hence, each first pad 214 is electrically connected to one of the corresponding second pads 216 through the conductive matrix pattern 212 and electrically insulated with the other second pads 216 to define the signal transmission paths 212b aforementioned. It should be noted that the disposition of gaps 212s separates the signal transmission paths 212b for transmitting different signals.

In the present embodiment, the color filter patterns 220 include a plurality of first filter patterns 222 and a plurality of second filter patterns 224. The first filter patterns 222 are located in the corresponding pixel areas R1, G1, and B1 respectively. The second filter patterns 224 are located in the non-display area NA and disposed on the second pads 216. The first filter patterns 222 are fabricated by using red filter material, green filter material, and blue filter material, for example. However, an embodiment depicted in FIG. 4 is for illustration only, and the arrangement of the pixel areas R1, G1, and B1 is not limited in the invention.

In the present embodiment, the second filter patterns 224 include a second red filter pattern R2, a second green filter pattern G2, and a second blue filter pattern B2. These three different colored filter patterns are disposed on the same second pad 216 in a co-planar manner. The second filter patterns 224 are served as markers or testing patterns for alignment, so as to prevent from poor alignment of the color filter patterns 220 on the first substrate 202, or prevent from rapid transparency change in the display area AA and the non-display area NA.

On the other hand, a plurality of scan lines 232, a plurality of data lines 234, a plurality of pixel structures 240, a plurality of third pads 242, and a plurality of fourth pads 244 are disposed on a second substrate 204 to constitute an array substrate 200b shown in FIG. 5. Each pixel structure 204 is electrically connected to one of the scan lines 232 and one of the data lines 234. The plurality of third pads 242 and the plurality of fourth pads 244 are located in the non-display area NA. In the present embodiment, each third pad 242 is directly connected to one of the scan lines 232. In other embodiments, when extending directions of the scan lines 232 and the data lines 234 are exchanged, each fourth pad 244 is also directly connected to one of the scan lines 232.

When the color filter substrate 200a and the array substrate 200b assemble to constitute the display panel 200, a plurality of pixel structures 240 is located in the corresponding pixel areas 212a (that is corresponding to the pixel areas R1, G1, and B1) respectively, and the conductive matrix pattern 212 corresponds to locations of the scan lines 232 and the data lines 234. Moreover, the third pads 242 and the first pads 214 are disposed oppositely, and the fourth pads 244 and the second pads 216 are disposed oppositely.

In the present embodiment, when the third pads 242 and the first pads 214 are electrically connected and the fourth pads 244 and the second pads 216 are electrically connected, the present embodiment allows the signals to be transmitted in the display area AA substantially, such that the demand for slim border can be attained without disposing additional signal transmission circuits on the two sides of the display area AA.

For example, referring to FIG. 4 and FIG. 6, the display panel 200 further includes, for example, a plurality of first spacers 271 and a plurality of second spacers 272. The first spacers 271 are disposed on the second filter patterns 224. The second spacers 272 are disposed on the first substrate 202 and located within the display area AA to maintain the distance (that is the cell gap) between the first substrate 202 and the second substrate 204. The first spacers 271 and the second spacers 272 can be made of organic material. In certain embodiments, the first spacers 271 and the second spacers 272 are made of, for example, photoresist material.

In details, each first spacer 271 has a first bottom surface 273 facing the first substrate 202 and at least one first side surface 275 adjacent to the first bottom surface 273. The first side surface 275 and the first bottom surface 273 forms a first included angle θ1. Each second spacer 272 has a second bottom surface 274 facing the first substrate 202 and at least one second side surface 276 adjacent to the second bottom surface 274. The second side surface 276 and the second bottom surface 274 forms a second included angle θ2. In the present embodiment, the first spacers 271 and the second spacers 272 are fabricated using the same material and the same fabrication process. Therefore, cross-sections of the first spacers 271 and the second spacers 272 have a trapezoid shape, for example, but the invention is not limited thereto. It should be noted that the first spacers 271 and the second spacers 272 have different sizes, thus the second included angle θ2 is different from the first included angle θ1. Particularly, the second included angle θ2 is larger than the first included angle θ1.

The display panel 200 further includes a plurality of transparent pads T disposed on the protection layer 260. The transparent pads T are disposed on the first substrate 202 to cover the first spacers 271 and contact the first pads 214 and the second pads 216. The display panel 200 further includes a common electrode layer 250 disposed on the second spacers 272 and the first filter patterns 222. In the present embodiment, the common electrode layer 250 and the transparent pads T are, for example, the same layer. That is, the common electrode layer 250 and the transparent pads T can be fabricated in the same step. The transparent pads T and the common electrode layer 250 are fabricated using a transparent conductive material, such as indium-tin oxide (ITO) or indium-zinc oxide (IZO).

It should be noted that the transparent pads T can be consecutively formed on the first bottom surfaces 273 and the first side surfaces 275 of the first spacers 271 by suitably designing the first included angles θ1 of the first spacers 271. Therefore, the first spacer 271 and the transparent pad T disposed thereon constitute a conductive spacer (not marked). The conductive spacer (not marked) can be directly disposed on the first pad 214 and the second pad 216. In addition, the conductive spacer (not marked) can be disposed on the second filter patterns R2, G2, and B2 which are disposed on the first pad 214 and the second pad 216. Namely, the second filter patterns R2, G2, and B2 can be optionally disposed or not disposed between the conductive spacer and the first and second pads 214 and 216. Moreover, each second included angle θ2 is larger than each first included angle θ1; that is, the second spacers 272 have steeper side walls. The common electrode layer 250 is thus disconnected on the second side surfaces 276 of the second spacers 272, as shown in an area C of FIG. 6. In other words, the devices on the second substrate 204 can be electrically connected to the transparent pads T and also electrically insulated with the common electrode layer 250 through the dimension design of the spacers in the present embodiment.

In addition, in order to prevent from the interference between the conductive devices on the first substrate 202, the display panel 200 includes the protection layer 260 disposed between the conductive light-shielding patterns (only the pads 212 and 216 are shown in FIG. 6) and the first spacers 271. As shown in FIG. 6, the color filter patterns 222, R2, G2, and B2 are disposed between the conductive light-shielding patterns (only the pads 212 and 216 are shown in FIG. 6) and the protection layer 260. The protection layer 260 has a plurality of contact openings H1 for exposing the plurality of first pads 214 and the plurality of second pads 216. However, an embodiment depicted in FIG. 6 is for illustration only, and the locations of the color filter patterns 222, R2, G2, and B2 and the protection layer 260 in the display panel 200 are not limited in the invention. In other embodiments, in order to enhance fabrication reliability, the protection layer 260 is first formed on the conductive light-shielding patterns (only the pads 212 and 216 are shown in FIG. 6), and the color filter patterns 222, R2, G2, and B2 are then formed on the protection layer 260 to prevent the high temperature from damaging the color filter patterns 222, R2, G2, and B2 during the fabrication of the protection layer 260.

Furthermore, a protection layer PV is disposed on the second substrate 204, for example, to protect the conductive devices on the second substrate 204 (i.e. the scan lines 232). In the present embodiment, the protection layer PV includes an insulation layer PV1 and a planar layer PV2. The protection layer PV, for example, includes a plurality of contact openings H2 for exposing the plurality of third pads 242 and the plurality of fourth pads 244. The display panel 200 of the present embodiment, for example, has a plurality of transparent pads PE disposed on the protection layer PV of the second substrate 204 and filled into the contact openings H2. Specifically, the transparent pads PE and pixel electrodes (not shown) in the pixel structures (240 shown in FIG. 5) are the same layer, for example, and can be formed on the protection layer PV simultaneously.

Since the display panel 200 of the present embodiment transmits signals through the disposition of the conductive light-shielding pattern 210 and the first spacers 271, the signal transmission between the driving circuit 290 and the scan lines 232 can be carried out in the display area AA. Thus, the area of the non-display area NA required by the display panel 200 is smaller. In other words, the border width W' of the display panel 200 is reduced significantly comparing to the border width W of the display panel 100, such that the slim border can be attained. Moreover, the conductive matrix pattern 212 is the light-shielding device originally disposed therein, and the aperture ratio of the display panel 200 thus is not adversely affected by the conductive matrix pattern 212.

Figure 7:
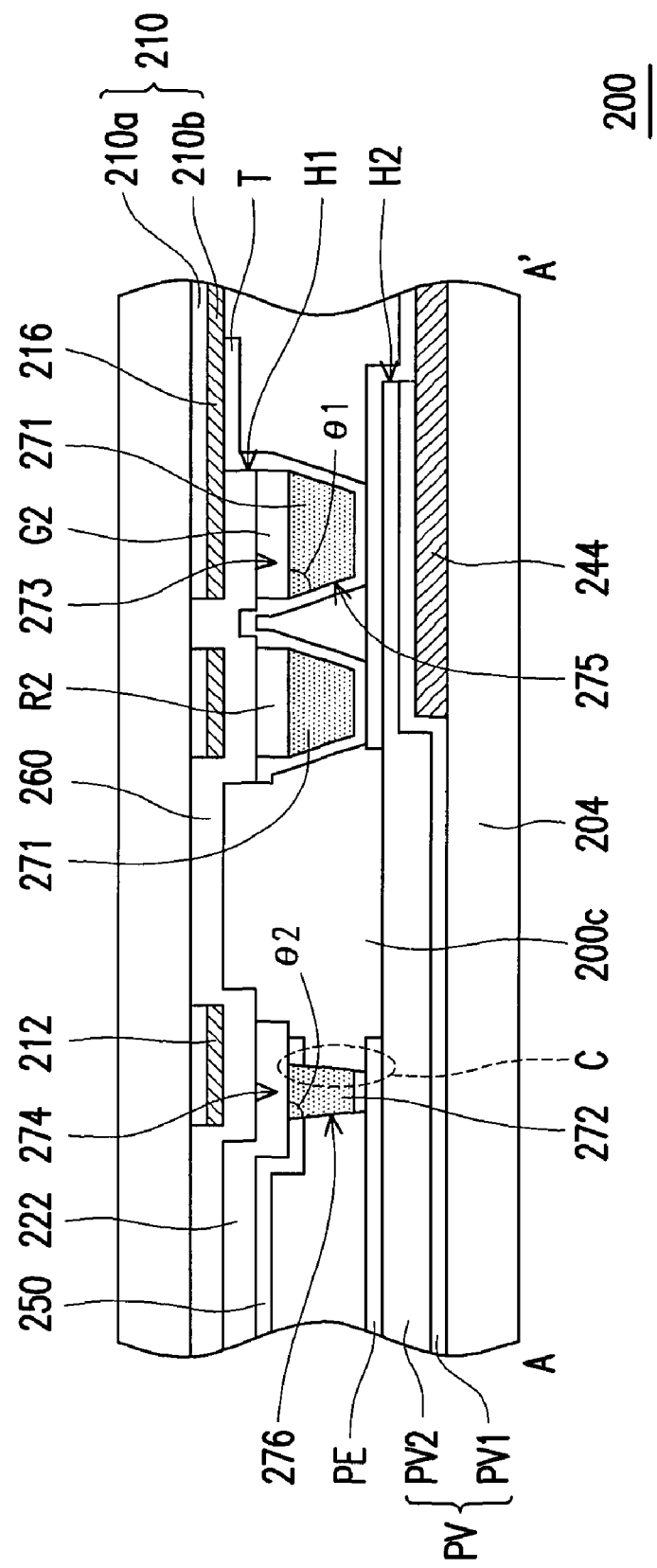
FIG. 7 is a schematic cross-sectional view of a portion of a display panel according to another embodiment of the invention.

FIG. 7 is a schematic cross-sectional view of a portion of a display panel according to another embodiment of the invention. Referring to FIG. 7, in order to reduce the resistance of the wires of the conductive light-shielding pattern 210, the conductive light-shielding pattern 210 of the invention can also be a stacked structure consisted of the light-shielding layer 210a and the conductive layer 210b. In the embodiment illustrated in FIG. 7, the light-shielding layer 210a is disposed on the first substrate 202 and the conductive layer 210b is disposed on the light-shielding layer 210a. The light-shielding layer 210a is made of, for example, metal oxide or black resin, and the conductive layer 210b is made of, for instance, metal. In certain embodiments, the light-shielding layer 210a and the conductive layer 210b can be fabricated by performing the same process such as the chemical vapor deposition (CVD) process or the physical vapor deposition (PVD) process multiple times to be formed on the first substrate 202.

Figure 8:
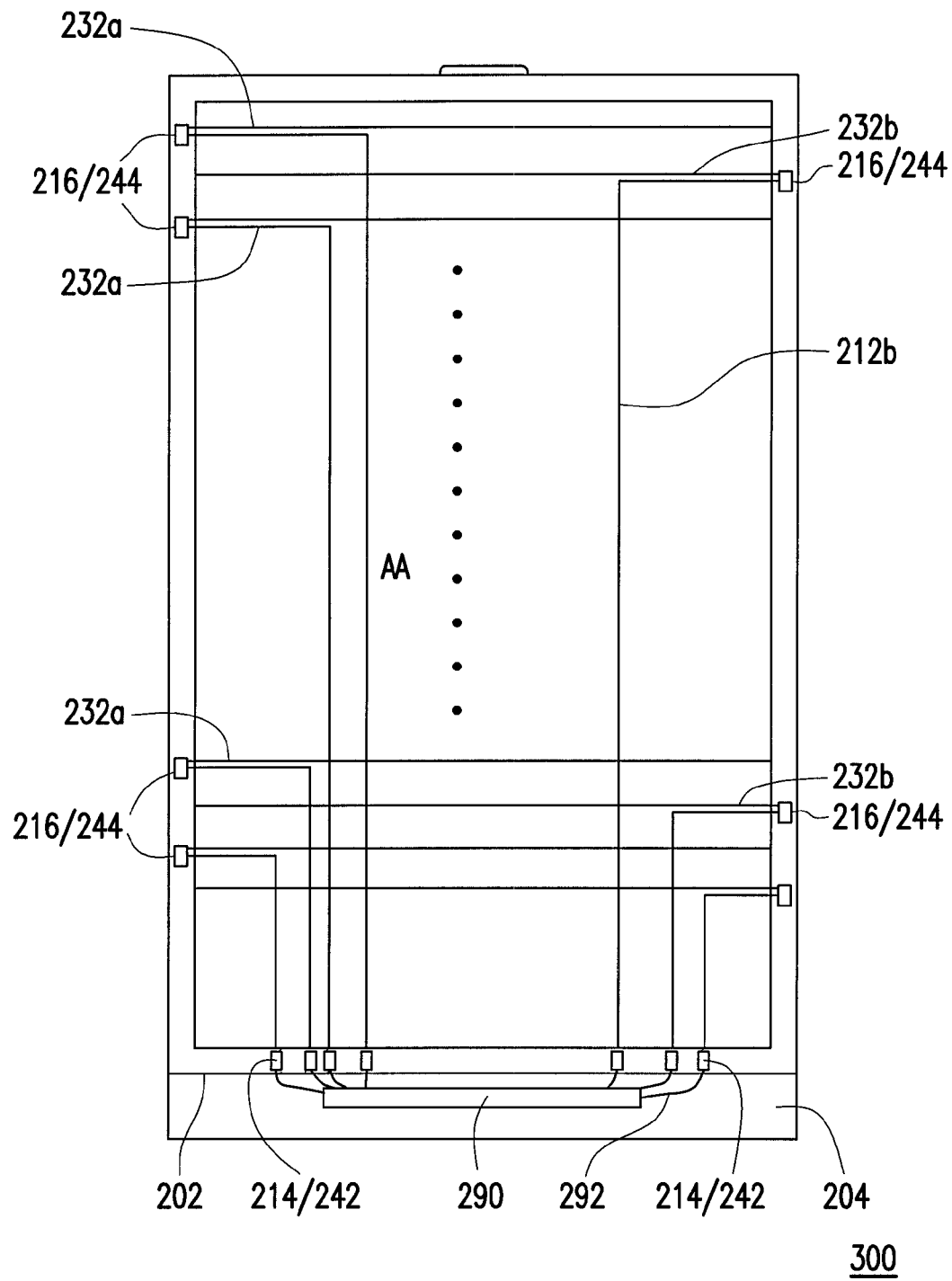
FIG. 8 is a schematic top view of a display panel according to another embodiment of the invention.

FIG. 8 is a schematic top view of a display panel according to another embodiment of the invention. Referring to FIG. 8, a display 300 and the display panel 200 are mainly constructed by the same elements marked with the same reference number. Accordingly, descriptions of these elements are not repeated hereinafter.

Specifically, the difference between the display panel 300 and the display panel 200 mainly lies in that the second pads 216 in the display panel 300 are simultaneously disposed at two opposite sides of the display panel 300 and the fourth pads 244 are also simultaneously disposed at two opposite sides of the display panel 300. As shown in the embodiment depicted in FIG. 8, the fourth pads 244 disposed at the left side of the display panel 300 are electrically connected to the odd scan lines 232a, i.e. the first, the third, the fifth . . . the $(2N+1)^{th}$ scan line, where N is a positive integer. Similarly, the other fourth pads 244 disposed at the right side of the display panel 300 are electrically connected to the even scan lines 232b, i.e. the second, the fourth, the sixth . . . the $(2N)^{th}$ scan line, where N is a positive integer.

The design of the display panel 300 is conducive to vary the wiring layout of the panel and apt to be applied in large size panels. In addition, the display panel 300 has the elements configured in the display panel 200 so that the display panel 300 is capable of achieving the objectives and the technical effects the display panel 200 achieves.

In summary, the display panel of the invention includes the conductive light-shielding pattern and the spacers disposed on the color filter substrate, so that the signals required by the scan lines or data lines can be transmitted in the display area. Thus, the display panel of the invention has a slim border. The conductive light-shielding pattern is original configured for shielding light so that the aperture ratio of the pixel structure is not negatively influenced. Accordingly, the display panel of the invention maintains high aperture ratio and has slim border.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel, having a display area and a non-display area located outside the display area, the display panel comprising:
   a first substrate;
   a conductive light-shielding pattern, disposed on the first substrate and defining a conductive matrix pattern, a plurality of first pads, and a plurality of second pads, the conductive matrix pattern demarcating the display area into a plurality of pixel areas, the first pads and the second pads being located in the non-display area, wherein each of the first pads is electrically connected to one of the corresponding second pads through the conductive matrix pattern and is electrically insulated with other second pads;
   a plurality of first spacers, disposed on the first pads and the second pads;
   a plurality of transparent pads, disposed on the first substrate, covering the first spacers, and contacting with the first pads and the second pads;
   a second substrate;
   a plurality of scan lines and a plurality of data lines, disposed on the second substrate and the scan lines being intersected with the data lines;
   a plurality of pixel structures, disposed on the second substrate and located in the corresponding pixel areas respectively, each pixel structure being electrically connected with one of the scan lines and one of the data lines; and
   a plurality of third pads and a plurality of fourth pads, disposed on the second substrate and located in the non-display area, the third pads being electrically connected to the first pads in a one-to-one manner, the fourth pads being electrically connected to the second pads in a one-to-one manner, and each fourth pad directly connected to one of the scan lines or one of the data lines.

2. The display panel as claimed in claim 1, further comprising a plurality of color filter patterns, disposed on the first substrate and comprising a plurality of first filter patterns and a plurality of second filter patterns, wherein the first filter patterns are located in the corresponding pixel areas respectively, the second filter patterns are located in the non-display area and disposed on the first pads and the second pads, and the first spacers are disposed on the second filter patterns.

3. The display panel as claimed in claim 2, further comprising a protection layer disposed between the conductive light-shielding pattern and the first spacers, wherein the protection layer has a plurality of contact openings exposing the first pads and the second pads, so that the transparent pads contact the first pads and the second pads.

4. The display panel as claimed in claim 3, wherein the color filter patterns are located between the conductive light-shielding pattern and the protection layer.

5. The display panel as claimed in claim 3, wherein the protection layer is located between the conductive light-shielding pattern and the color filter patterns.

6. The display panel as claimed in claim 1, further comprising a display medium disposed between the first substrate and the second substrate.

7. The display panel as claimed in claim 6, wherein the display medium comprises a liquid crystal material, an electrophoresis material, or an organic luminescent material.

8. The display panel as claimed in claim 1, wherein each first spacer comprises a first bottom surface facing the first substrate and at least one first side surface adjacent to the first bottom surface, and the first side surface and the first bottom surface constitute a first included angle.

9. The display panel as claimed in claim 8, further comprising a plurality of second spacers, disposed on the first substrate and located within the display area, wherein each second spacer comprises a second bottom surface facing the first substrate and at least one second side surface adjacent to the second bottom surface, and the second side surface and the second bottom surface constitute a second included angle larger than the first included angle.

10. The display panel as claimed in claim 9, further comprising a common electrode layer disposed on the second spacers and the pixel areas, wherein the common electrode layer is disconnected at the second side surface of the second spacers.

11. The display panel as claimed in claim 1, wherein a material of the conductive light-shielding pattern comprises a metal, a metal oxide, or a metal nitride.

12. The display panel as claimed in claim 1, wherein the conductive light-shielding pattern comprises:
   a light-shielding layer, disposed on the first substrate; and
   a conductive layer, disposed on the light-shielding layer.

* * * * *